United States Patent [19]
Nishikawa

[11] Patent Number: 5,740,063
[45] Date of Patent: Apr. 14, 1998

[54] MEASURING INSTRUMENT

[75] Inventor: Tomoyuki Nishikawa, Tokyo, Japan

[73] Assignee: Ando Electric Co., Ltd., Tokyo, Japan

[21] Appl. No.: 704,076

[22] Filed: Aug. 28, 1996

[30] Foreign Application Priority Data

Aug. 30, 1995 [JP] Japan .................. 7-245385

[51] Int. Cl.⁶ .................................. G01R 23/16
[52] U.S. Cl. ................... 364/481; 364/487; 324/111
[58] Field of Search .................... 345/203, 508, 345/511, 512; 364/481, 487; 324/111, 112, 113; 360/6

[56] References Cited

U.S. PATENT DOCUMENTS

| | | | |
|---|---|---|---|
| 4,040,027 | 8/1977 | Van Es et al. | 395/877 |
| 4,816,815 | 3/1989 | Yoshiba | 345/201 |
| 4,890,099 | 12/1989 | Takano | 345/123 |
| 5,179,697 | 1/1993 | Nishii et al. | 395/220 |
| 5,513,256 | 4/1996 | Komuro | 379/156 |

*Primary Examiner*—James P. Trammell
*Assistant Examiner*—Demetra R. Smith
*Attorney, Agent, or Firm*—Finnegan, Henderson, Farabow, Garrett & Dunner, L.L.P.

[57] ABSTRACT

A measuring instrument has first and second memories for storing measured data. A display displays the measured data stored in the first memory. When a new measured data is obtained in the measuring instrument, the measured data is written in the first memory. The old data measured prior to the new measured data is transferred from the first memory to the second memory before the new measured data is written in the first memory. When a data restore command is given, a data relocation is carried out between the first and the second memories.

2 Claims, 6 Drawing Sheets

MEASURING INSTRUMENT

BACKGROUND OF THE INVENTION

1. Field of the Invention

The present invention relates to measuring instruments having a memory for storing measured data.

2. Background Art

In general, in measuring instruments such as in optical spectrum measuring instruments, memories are provided for storing measured data including a measured result data of a signal light and a measuring condition data. FIG. 8 is a block diagram showing a configuration of a conventional measuring instrument having such a memory.

In FIG. 8, 1 designates a light source; 1A designates an optical fiber; 2 designates a measuring section; 3 designates a CPU; 4 designates an input device such as a keyboard; 5 designates an auxiliary memory; 6 designates an external memory; 7 designates a display; and 8 designates a RAM (Random Access Memory) which is a memory means for storing measured data.

In the measuring instrument shown in FIG. 8, a light emitted from the light source 1 propagates through the optical fiber 1A and is received by the measuring section 2. When a command to take a measurement is given to the measuring section 2 by the CPU 3, wavelength characteristics are determined by the measuring section 2 based on the light thus received. Resulting measured data which indicate the wavelength characteristic is then obtained from measuring section 2. Measured data including the measured result data thus obtained and measuring condition data which indicates the measuring condition is stored in the RAM 8 and is displayed on the display 7 by the CPU 3.

In this situation, there are cases in which the measured result data in the RAM 8 is erased or the measured condition data is erroneously altered changed accidentally such as by an error of key input operation of the input device 4.

In order to overcome this problem, the auxiliary memory 5 or the external memory 6 is used to reserve the measured data in the RAM 8.

That is to say, when an user operates the input device 4 to input a reserve command, the measured data is read out from the RAM 8 and is written in the auxiliary memory 5 or in the external memory 6. If the measured data is erased or changed by a mistake of an input operation, the user can input a restore command by the input device 4 to transfer the measured data from the auxiliary memory 5 or from the external memory 6 to the RAM 8.

In the conventional measuring instrument, however, it is necessary for the user to input the reserve command in order to restore the content of the RAM 8. If the user misses the input of the reserve command, the user cannot restore the measured data in the RAM 8.

SUMMARY OF THE INVENTION

Accordingly, it is an object of the present invention to provide a measuring instrument which can automatically back up measured data in a memory.

In an aspect of the present invention, there is provided a measuring instrument comprising first and second memories for storing measured data; data display means for displaying the measured data stored in the first memory; data writing means for writing new measured data in the first memory and for transferring old measured data, prior to the transfer of the new measured data, from the first memory to the second memory before the new measured data is written in the first memory; and data restoring means for transferring the old measured data to the first memory in response to a data restore command.

The present invention further provides a measuring instrument comprising first and second memories for storing measured data; data display means for displaying the measured data stored in the first memory; data writing means for writing a new measured data in the first memory and for transferring an old measured data prior to the new measured data from the first memory to the second memory before the new measured data is written in the first memory; and data restoring means for carrying out a data relocation between the first and the second memories to a data restore command.

DETAILED DESCRIPTION OF THE PREFERRED EMBODIMENTS

Hereinbelow, a preferred embodiment of the present invention will be explained with reference to the Figures.

Figure 1:
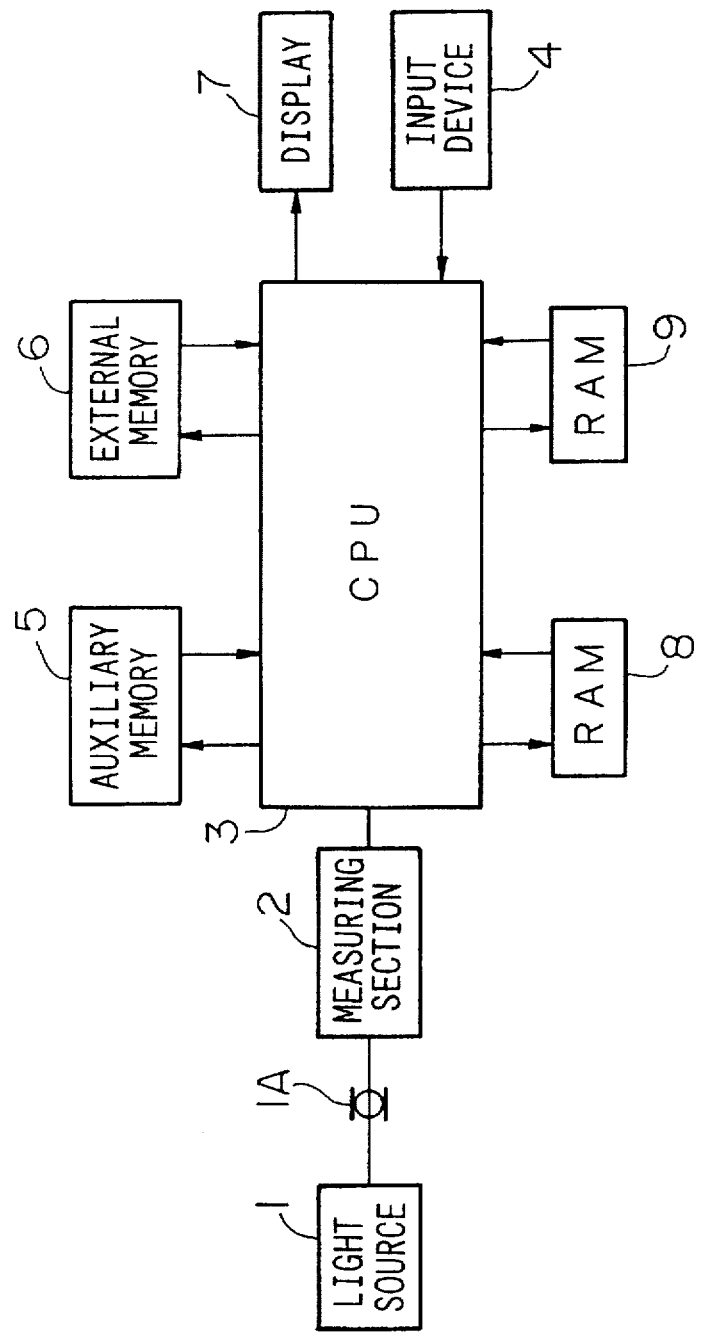
FIG. 1 is a block diagram showing the configuration of an optical spectrum measuring instrument according to a preferred embodiment of the present invention.
Figure 8:
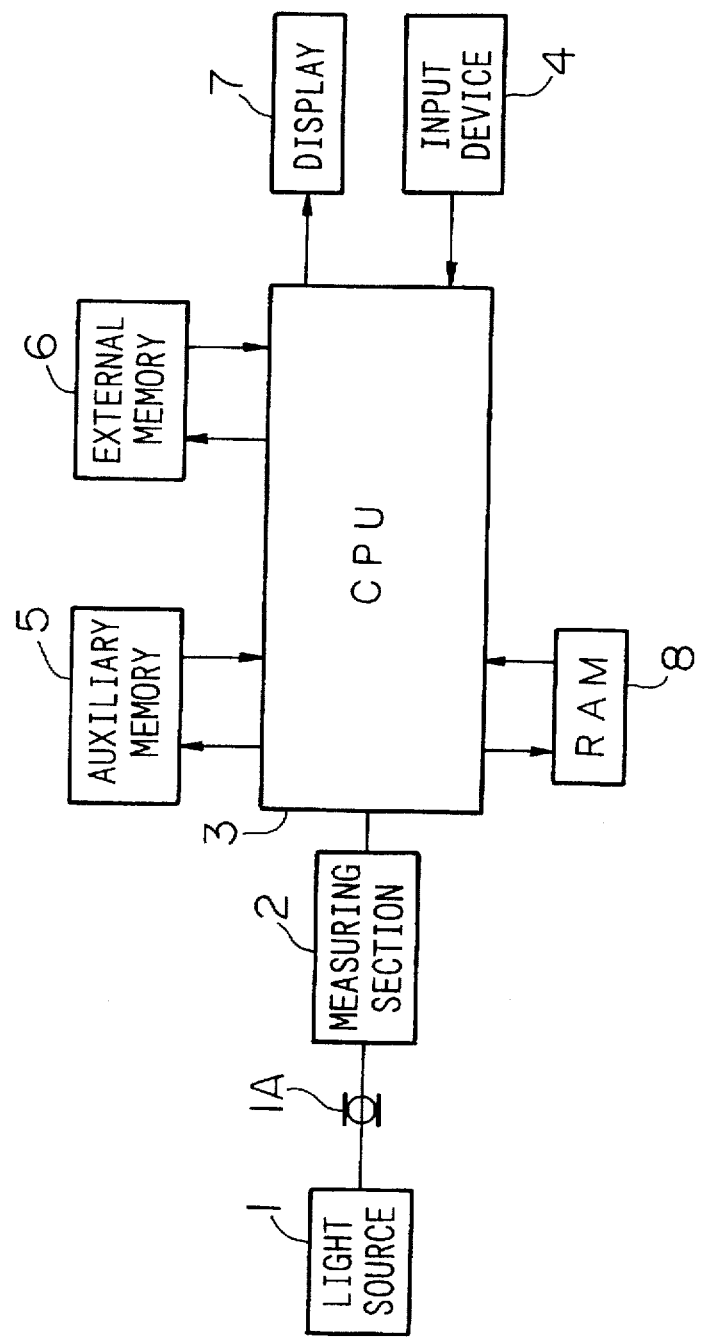
FIG. 8 is a block diagram showing the configuration of a conventional measuring instrument.

FIG. 1 is a block diagram showing the configuration of an optical spectrum measuring instrument according to a preferred embodiment of the present invention. The members which are identical to those of the conventional instrument shown in FIG. 8 are designated by the same reference numerals as in the instrument, and descriptions thereof will be omitted.

In the measuring instrument shown in FIG. 1, a RAM 9 is added. In FIG. 1, the RAM 8 is used as a first memory for storing new measured data. The RAM 9 is used as a second memory for reserving the measured data which was previously stored in the RAM 8 and which preceded the new measured data.

Figure 2:
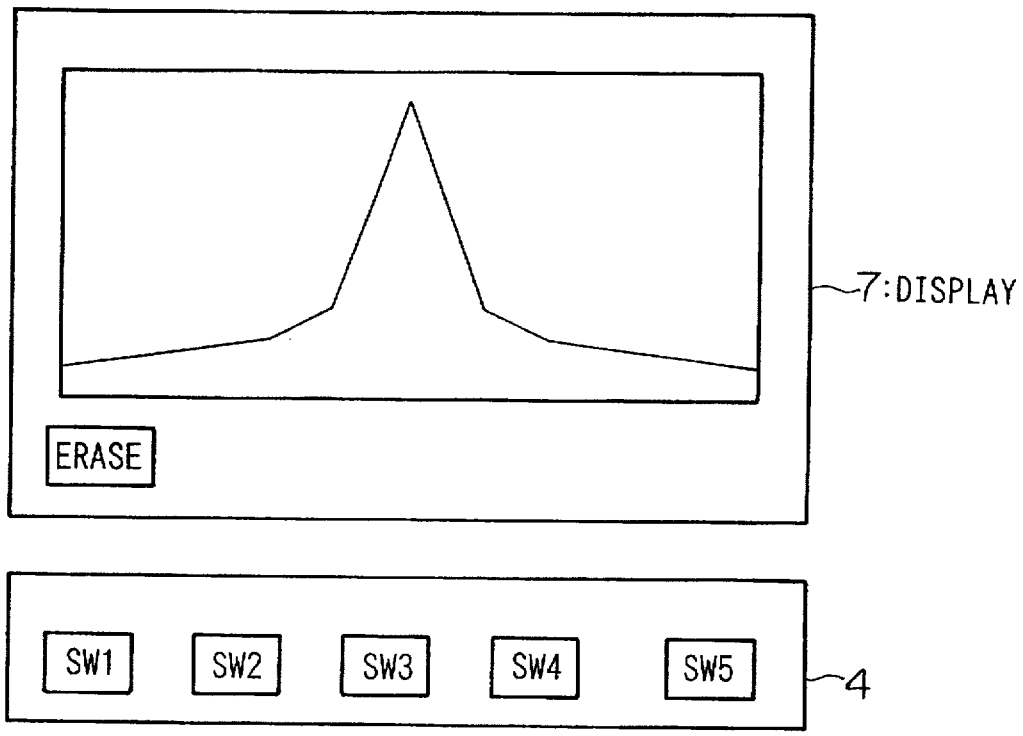
FIGS. 2–4 show examples of display images on a display of the optical spectrum measuring instrument.
Figure 3:
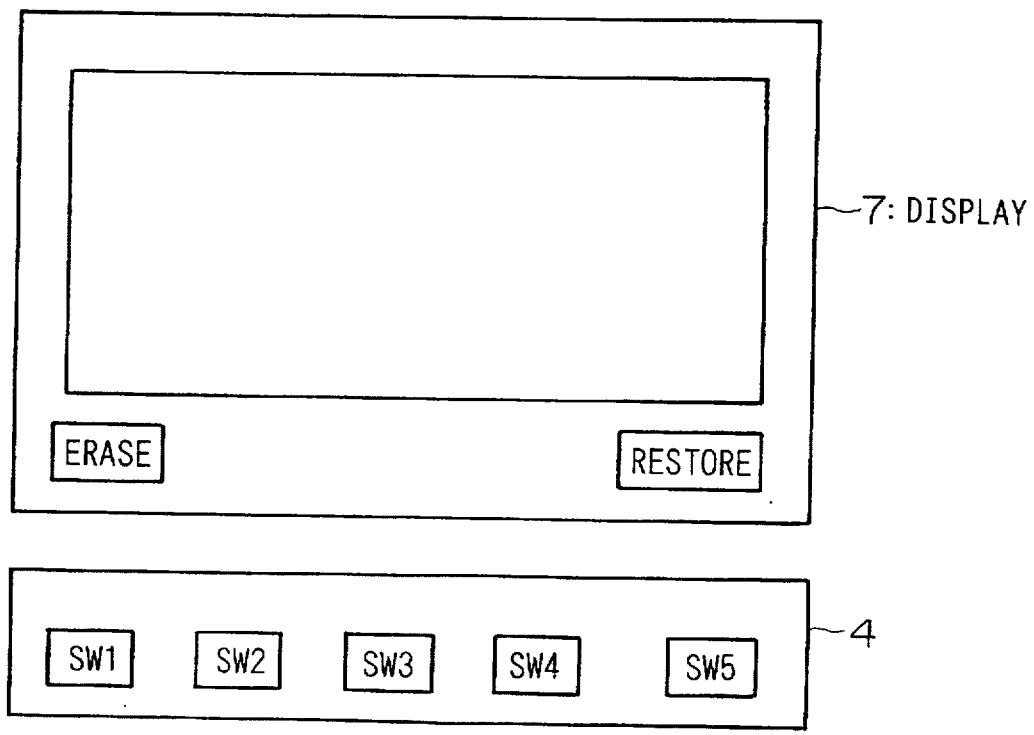
Figure 4:
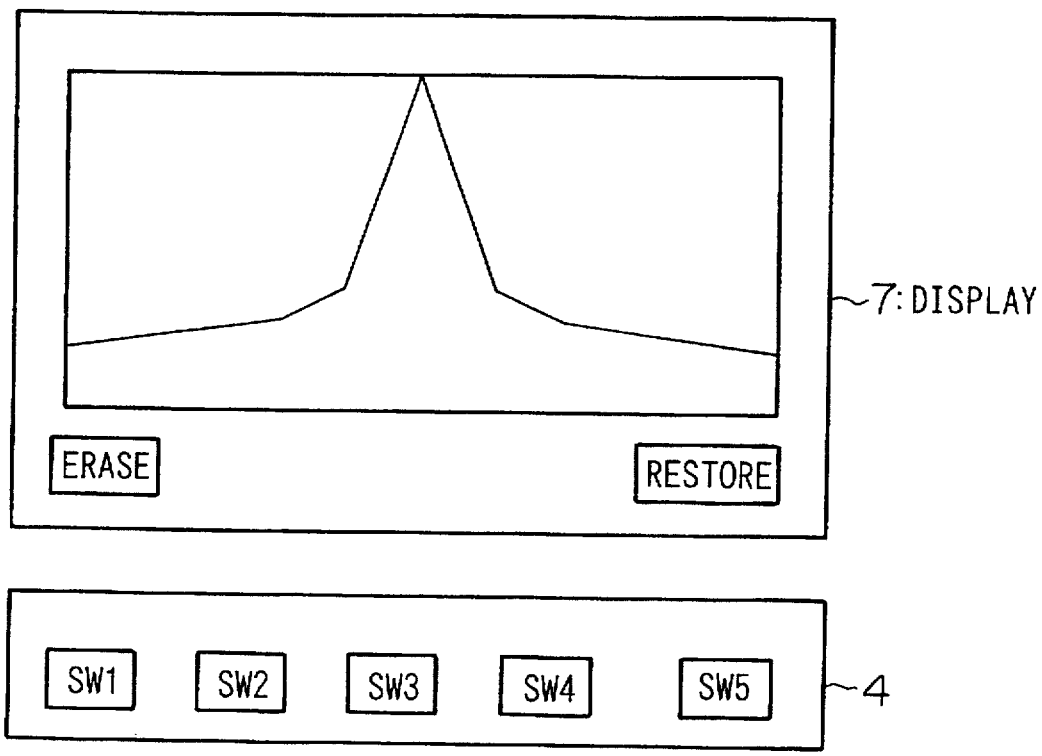
Figure 5:
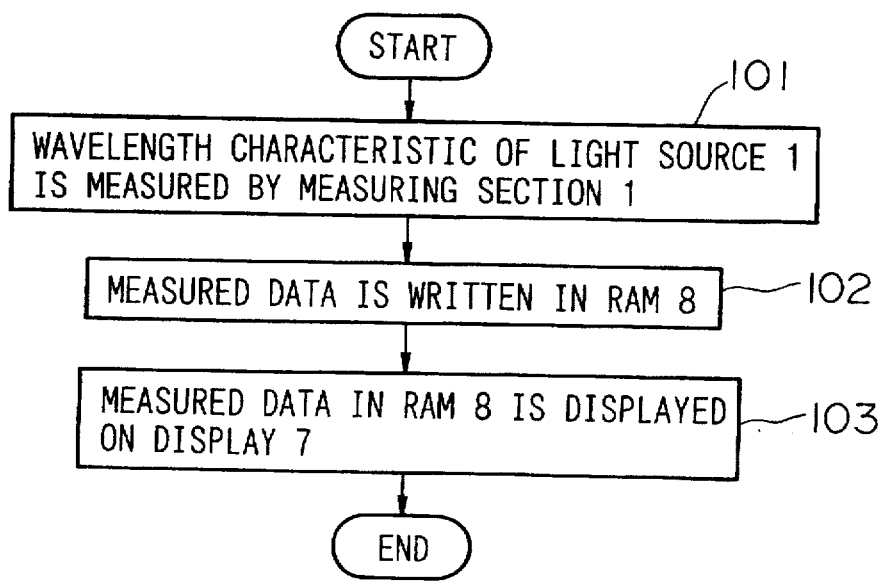
FIGS. 5 and 6 are flow charts showing the operations of the optical spectrum measuring instrument.
Figure 6:
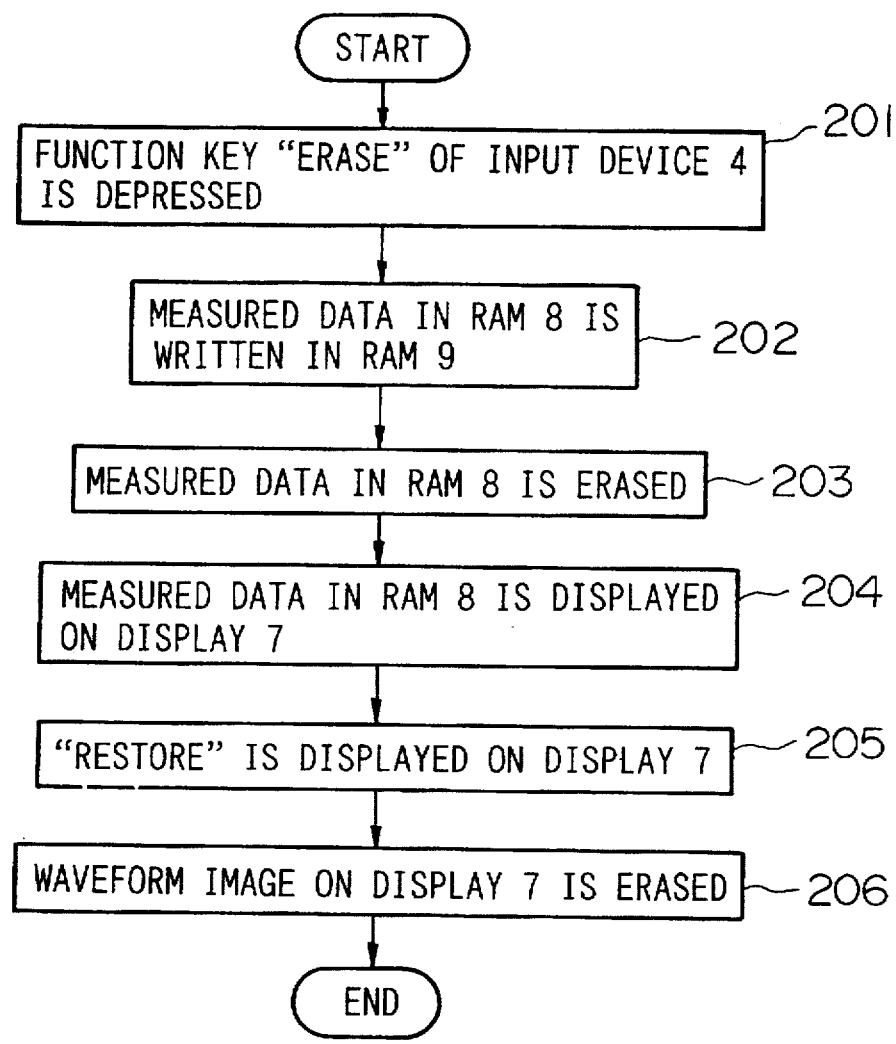

FIGS. 2–4 show examples of display images on the display 7. FIGS. 5 and 6 are flow charts showing the operations of the measuring instrument. The operation of the measuring instrument will be described with reference to these figures.

FIG. 5 shows an operation of the measuring instrument in which a wavelength characteristics of the light source 1 is measured by the measuring instrument. In step 101, a wavelength characteristics of the light source 1 is measured by the measuring section 2. Next, in step 102, new measured data including a measured result data and a measuring condition data is stored in the RAM 8. The measured result data indicates the wavelength characteristic. The measuring condition data indicates the measuring condition in which the wavelength characteristic is measured. If an old measured data prior to the new measured data has been stored in the RAM 8, the old measured data is transferred to the RAM 9 before the new measured data is written in the RAM 8. Next, in step 103, the measured data in the RAM 8 is displayed on the display 7.

FIG. 2 shows an example of a displayed image on the display 7. As shown in FIG. 2, a waveform indicating the measured result data is displayed on the display 7. Under the waveform, a function menu showing "ERASE" is displayed to indicate the function assigned to a function key SW1 of the input device 4. At this stage, no data is stored in the RAM 9.

FIG. 6 shows an operation of the measuring instrument in which the measured data stored in the RAM 8 is erased. In step 201, the function key SW1 to which the "ERASE" function is assigned is depressed by a user. Next, in step 202, the measured data is read out from the RAM 8 and is written in the RAM 9 in response to the designation of the "ERASE" function. Next, in step 203, the measured data in the RAM 8 is erased. Next, in step 204, the measured data stored in the RAM 8 is displayed on the display 7. In step 205, a menu of "RESTORE" is displayed on the lower display area of the display 7. In step 206, the waveform displayed on the display 7 is erased.

FIG. 3 shows the display image on the display 7 after the completion of the steps 201–206 described above. As shown in FIG. 3, no waveform is displayed on the display 7. The menus "ERASE" and "RESTORE" are displayed on the lower area of the display 7 to respectively indicate the function assigned to the function key SW1 and that assigned to the function key SW5. At this stage, the measured data, which has been previously stored in the RAM 8, is reserved in the RAM 9, and the measured data in the RAM 8 is erased.

Figure 7:
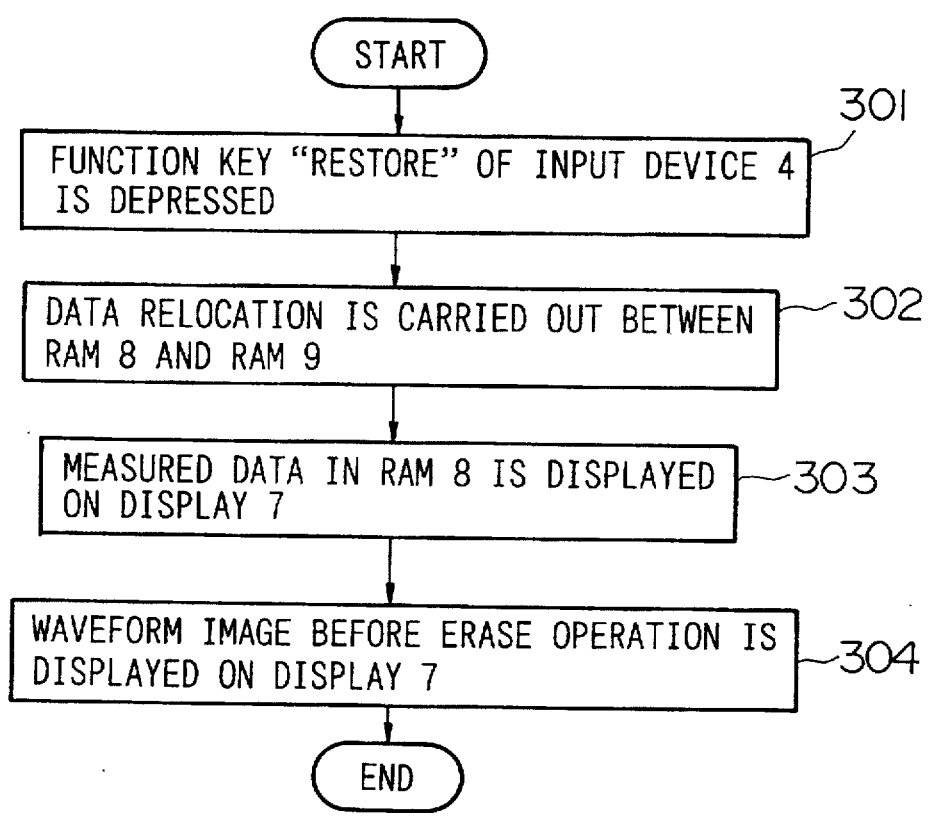
FIG. 7 is a flow chart showing an data restore operation of the measuring instrument.

FIG. 7 shows an data restore operation of the measuring instrument. In step 301, the function key SW5 to which the "RESTORE" function is assigned is depressed by the user. Next, in step 302, a data relocation is carried out between the RAMs 8 and 9 in response to the designation of the "RESTORE" function. That is to say, the measured data are read out from the RAMs 8 and 9. The read out data of the RAM 8 is then written in the RAM 9 and the read out data of the RAM 9 is then written in the RAM 8. Next, in step 303, the measured data stored in the RAM 8 is displayed on the display 7. In step 304, the waveform, which has been displayed before the measured data in the RAM 8 has been erased, is displayed on the display 7.

FIG. 4 shows the display image on the display 7 after the completion of the steps 301–304 described above. As shown in FIG. 4, the waveform, which has been displayed as shown in FIG. 2 before the measured data in the RAM 8 has been erased, is displayed on the display 7. The menus "ERASE" and "RESTORE" are displayed on the lower area of the display 7 to respectively indicate the function assigned to the function key SW1 and that assigned to the function key SW5. At this stage, the data relocation has been completed as described above. Therefore, the measured data is stored in the RAM 8 and no data is stored in the RAM 9.

If the function key SW5 to which the "RESTORE" function is assigned is depressed, the data relocation is carried out again. As a result, the measured data, which has been stored in the RAM 8, is written in the RAM 9, and null data is written in the RAM 8. Thus, the display of the waveform on the display 7 is erased.

In the above description, the optical spectrum measuring instrument is disclosed as a preferred embodiment of the present invention. However, the present invention can be applied to the other measuring instruments which can display waveform data.

Furthermore, in the preferred embodiment, the data relocation is carried out in response to the designation of the "RESTORE" function. However, the operation of the "RESTORE" function is not restricted to this data relocation and various modification may be provided. For example, the data transfer from the RAM 9 to the RAM 8 may be carried out in response to the designation of the "RESTORE" function. In this modification, the data in the RAM 9 is not replaced by the data in the RAM 8 and only the data in the RAM 8 is replaced by the data in the RAM 9.

What is claimed is:

1. A measuring instrument comprising:

first and second memories for storing measured data;

data display means for displaying the measured data stored in the first memory;

data writing means for writing a new measured data in the first memory and for transferring a previously measured data from the first memory to the second memory before the new measured data is written in the first memory; and data restoring means for transferring the old measured data to the first memory in response to a data restore command.

2. A measuring instrument comprising:

first and second memories for storing measured data;

data display means for displaying the measured data stored in the first memory;

data writing means for writing a new measured data in the first memory and for transferring a previously measured data from the first memory to the second memory before the new measured data is written in the first memory; and data restoring means for carrying out a data relocation between the first and the second memories to a data restore command.

* * * * *